(12) United States Patent
Lim et al.

(10) Patent No.: US 12,184,466 B2
(45) Date of Patent: Dec. 31, 2024

(54) METHOD AND APPARATUS FOR MULTI-USER SCHEDULING IN WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Chaehee Lim, Gyeonggi-do (KR); Sooyong Choi, Seoul (KR); Gyuyeol Kong, Seoul (KR); Seongbae Han, Seoul (KR); Dongheon Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 17/776,785

(22) PCT Filed: Nov. 11, 2020

(86) PCT No.: PCT/KR2020/095138
§ 371 (c)(1),
(2) Date: May 13, 2022

(87) PCT Pub. No.: WO2021/096334
PCT Pub. Date: May 20, 2021

(65) Prior Publication Data
US 2022/0400043 A1 Dec. 15, 2022

(30) Foreign Application Priority Data
Nov. 13, 2019 (KR) .................. 10-2019-0145403

(51) Int. Cl.
*H04L 27/26* (2006.01)
*H04L 5/00* (2006.01)
(Continued)

(52) U.S. Cl.
CPC ........ *H04L 27/2657* (2013.01); *H04L 5/0037* (2013.01); *H04L 5/0062* (2013.01);
(Continued)

(58) Field of Classification Search
CPC ............. H04L 27/2657; H04L 27/2666; H04L 27/2686; H04L 5/0037; H04L 5/0062; H04W 72/121; H04W 72/1273
(Continued)

(56) References Cited

U.S. PATENT DOCUMENTS 8,594,238 B2   11/2013   Jwa et al.
8,849,353 B2   9/2014    Foschini et al.
(Continued)

FOREIGN PATENT DOCUMENTS

KR   1020040110038   12/2004
KR   1020060011758   2/2006
(Continued)

OTHER PUBLICATIONS

Nokia et al., "On Configured Grant Enhancements for NR URLLC", R1-1900932, 3GPP TSG RAN WG1 Ad-Hoc Meeting 1901, Jan. 21-25, 2019, 12 pages.
(Continued)

*Primary Examiner* — Kevin M Burd
(74) *Attorney, Agent, or Firm* — The Farrell Law Firm, P.C.

(57) ABSTRACT

The disclosure relates to a wireless communication system, and relates to a method and apparatus for scheduling a plurality of user equipments (UEs) by considering a frequency selectivity. A method, performed by a base station, for transmitting or receiving data in a wireless communication system according to an embodiment includes determining a UE candidate group set based on channel state information for channels of a plurality of carriers, determining an
(Continued)

offset used to adjust the number of UEs of the UE candidate group set, based on frequency selectivity information between a representative channel selected from among the channels of the plurality of carriers and other channels, based on the offset, determining a plurality of UEs to which data is to be transmitted, and transmitting the data to the determined plurality of UEs.

8 Claims, 11 Drawing Sheets

(51) Int. Cl.
*H04W 72/121* (2023.01)
*H04W 72/1273* (2023.01)

(52) U.S. Cl.
CPC ...... *H04L 27/2666* (2013.01); *H04L 27/2686* (2013.01); *H04W 72/121* (2013.01); *H04W 72/1273* (2013.01)

(58) Field of Classification Search
USPC ......................................................... 375/262
See application file for complete search history.

(56) References Cited

U.S. PATENT DOCUMENTS

| 10,904,901 | B2 | 1/2021 | Kim et al. | |
|---|---|---|---|---|
| 2008/0247475 | A1* | 10/2008 | Kim | H04B 7/0619 375/260 |
| 2013/0051321 | A1* | 2/2013 | Barbieri | H04L 1/0029 370/328 |
| 2018/0205443 | A1* | 7/2018 | Kumagai | H04B 7/0695 |
| 2018/0375557 | A1* | 12/2018 | Noh | H04B 7/066 |
| 2020/0366407 | A1* | 11/2020 | Lnu | H04L 1/0026 |

FOREIGN PATENT DOCUMENTS

| KR | 1020110068790 | 6/2011 |
|---|---|---|
| WO | WO 2017/034238 | 3/2017 |

OTHER PUBLICATIONS

Goran Dimic et al., "On Downlink Beamforming with Greedy User Selection: Performance Analysis and a Simple New Algorithm", IEEE Transactions on Signal Processing, vol. 53, No. 10, Oct. 2005, 16 pages.

Taesang Yoo et al., "On the Optimality of Multiantenna Broadcast Scheduling Using Zero-Forcing Beamforming", IEEE Journal on Selected Areas in Communications, vol. 24, No. 3, Mar. 2006, 14 pages.

International Search Report dated Feb. 18, 2021 issued in counterpart application No. PCT/KR2020/095138, 6 pages.

Yongjiu Du et al., "SAMU: Design and Implementation of Frequency Selectivity-Aware Multi-User MIMO for WLANS", EURASIP Journal on Wireless Communications and Networking, Dec. 22, 2018, 17 pages.

Deli Qiao et al., "Is Precoding for Massive MIMO Systems Well-Analyzed?", 11th International Symposium on Wireless Communiations Systems, Aug. 26, 2014, 5 pages.

Stefan Pratschner et al., "Single-User and Multi-User MIMO Channel Estimation for LTE-Advanced Uplink", IEEE International Conference on Communications, May 21, 2017, 6 pages.

European Search Report dated Oct. 18, 2022 issued in counterpart application No. 20887412.3-1203, 6 pages.

* cited by examiner

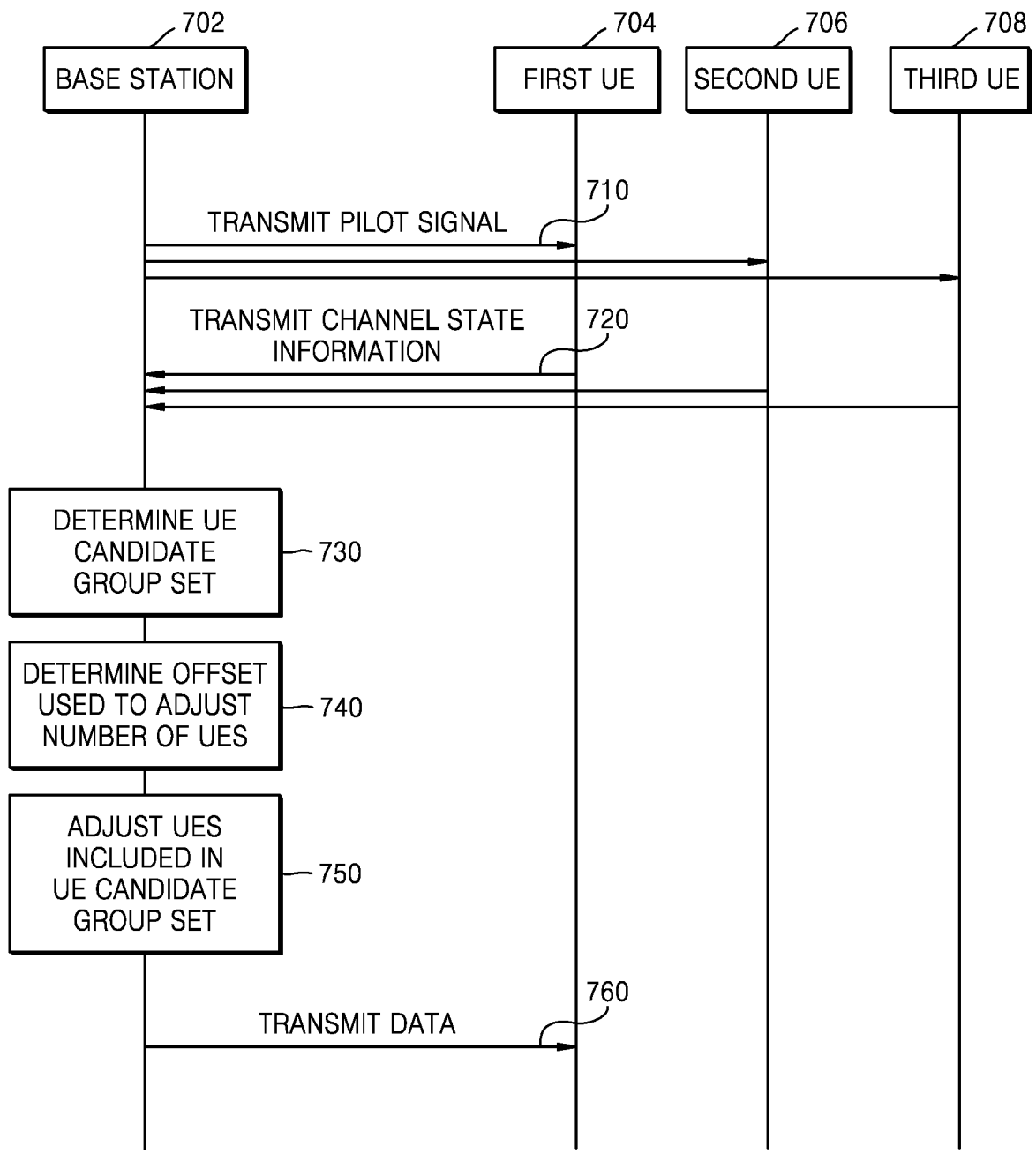

METHOD AND APPARATUS FOR MULTI-USER SCHEDULING IN WIRELESS COMMUNICATION SYSTEM

PRIORITY

This application is a National Phase Entry of PCT International Application No. PCT/KR2020/095138, which was filed on Nov. 11, 2020, and claims priority to Korean Patent Application No. 10-2019-0145403, which was filed on Nov. 13, 2019, the entire content of each of which is incorporated herein by reference.

TECHNICAL FIELD

The disclosure relates to a wireless communication system, and to a method and apparatus by which a base station and a user equipment (UE) transmit and receive data. More particularly, the disclosure relates to a method by which a base station schedules a plurality of UEs by considering a frequency selective fading channel.

BACKGROUND ART

In order to meet increasing demand with respect to wireless data traffic after the commercialization of $4^{th}$ generation (4G) communication systems, efforts have been made to develop $5^{th}$, generation (5G) or pre-5G communication systems. For this reason, 5G or pre-5G communication systems are called beyond 4G network communication systems or post long-term evolution (post-LTE) systems. A 5G communication system defined in the $3^{rd}$ generation partnership project (3GPP) is called a new radio (NR) system. In order to achieve high data rates, the implementation of 5G communication systems in an ultra-high frequency millimeter-wave (mmWave) band (e.g., a 60-gigahertz (GHz) band) is being considered. In order to reduce the pathloss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed, and have been applied to NR systems. Also, in order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. Also, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, technology elements such as sensing technology, wired/wireless communication and network infrastructures, service interface technology, and security technology are required, and thus, technologies for inter-object connection, such as sensor network, machine to machine (M2M) communication, and machine-type communication (MTC), have recently been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts have been made to apply 5G communication systems to IoT networks. For example, 5G communication such as sensor network, M2M communication, or MTC is implemented by technology such as beamforming, MIMO, or array antenna. The application of cloud radio access network (Cloud-RAN) as the above-described big data processing technology may also be an example of convergence of 5G communication technology and IoT technology.

As described above, as various services may be provided according to the development of mobile communication systems, methods for effectively providing the services are required. In particular, as a user scheduling method by which a base station may efficiently transmit data to a user equipment (UE), a greedy user selection (GUS) method, a semi-orthogonal user selection (SUS) method, a random orthogonal beamforming (RBF) method, etc. are being studied. However, these methods are proposed in a system using a single carrier or a narrowband assuming frequency flat fading, and thus, the performance of these methods may be degraded in a frequency band where frequency selective fading exists. Accordingly, a user scheduling method by which a base station may efficiently transmit data to a UE even in a frequency band where frequency selective fading exists needs to be studied.

DESCRIPTION OF EMBODIMENTS

Solution to Problem

According to an embodiment of the disclosure, a method and apparatus by which a base station transmits data to a user equipment (UE) by performing multi-user scheduling in a wireless communication system may be provided.

Also, according to an embodiment of the disclosure, a method and apparatus by which a UE receives data from a base station in a wireless communication system may be provided.

Advantageous Effects of Disclosure

According to the present embodiment, in a wireless communication system, a base station may schedule multi-users by considering a frequency selectivity, thereby improving reception performance of the multi-users.

BRIEF DESCRIPTION OF DRAWINGS

FIG. 7 is a diagram illustrating a method by which a base station transmits data to some of a plurality of UEs by adjusting UEs included in a UE candidate group set, based on channel state information received from the plurality of UEs, according to an embodiment.

BEST MODE

Figure 1:
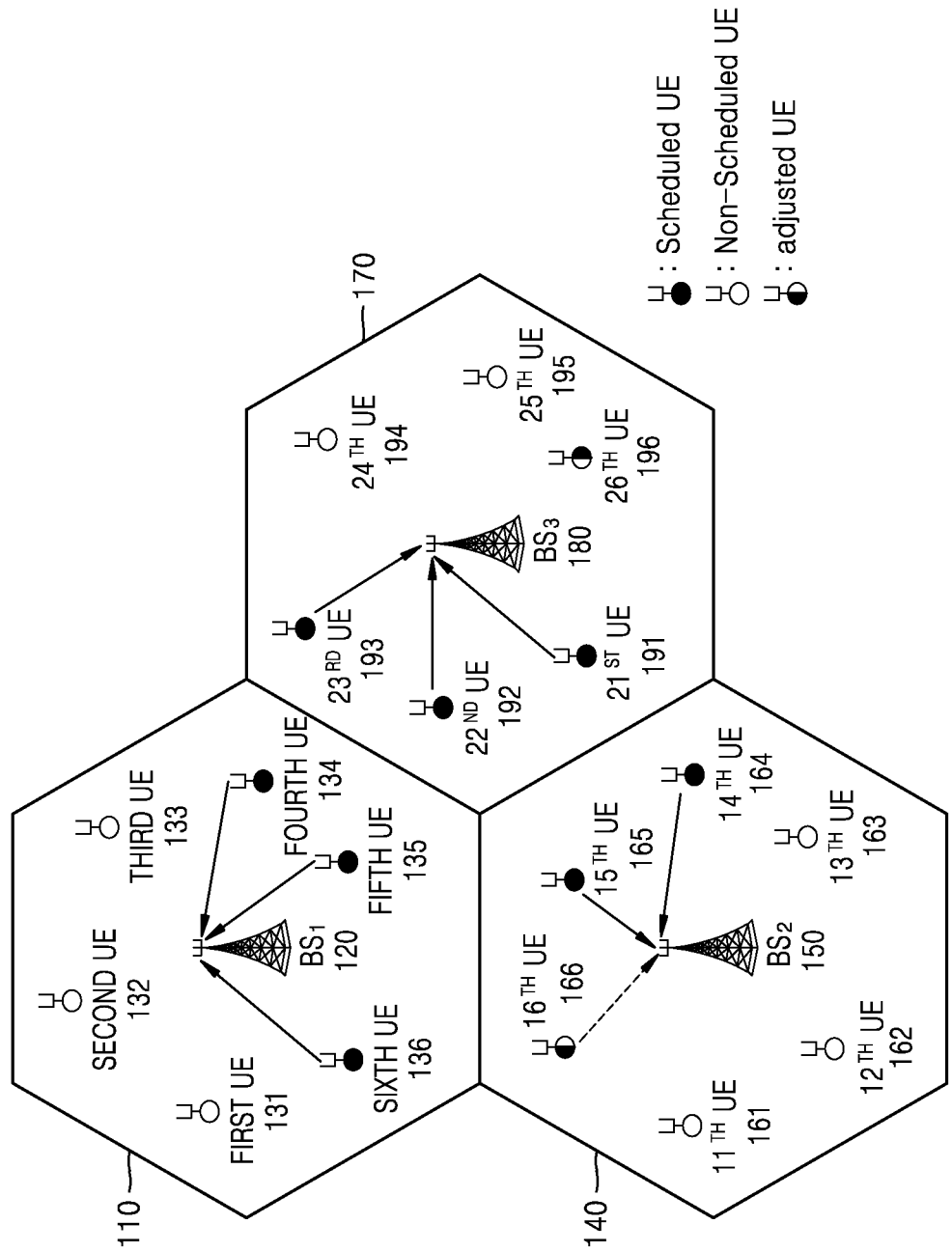
FIG. 1 is a diagram for describing a structure of a communication system, according to an embodiment.

A method, performed by a base station, for transmitting or receiving data in a wireless communication system according to an embodiment of the disclosure includes determining a user equipment (UE) candidate group set based on channel state information for channels of a plurality of carriers, determining an offset used to adjust the number of UEs of the UE candidate group set, based on frequency selectivity information between a representative channel selected from among the channels of the plurality of carriers and other channels, based on the offset, determining a plurality of UEs to which data is to be transmitted, and transmitting the data to the determined plurality of UEs.

The determining of the offset may include, based on the channel state information, obtaining the frequency selectivity information including at least one of peak-to-average power ratio (PAPR) information or correlation information, determining a frequency selectivity, based on the obtained frequency selectivity information, comparing the determined frequency selectivity with a pre-set threshold value, and determining the offset, based on a result of the comparing.

The determining of the offset may include, based on the result of the comparing, in case that the frequency selectivity is greater than the threshold value, determining the offset as a first offset, and in case that the frequency selectivity is less than the threshold value, determining the offset as a second offset, and wherein the determining of the plurality of UEs to which the data is to be transmitted may include by adding the determined offset to the number of UEs of the UE candidate group set, determining to reduce the number of UEs in case that the frequency selectivity is greater than the threshold value and to increase the number of UEs in case that the frequency selectivity is less than the threshold value, and determining the plurality of UEs to which the data is to be transmitted, based on the reduced or increased number of UEs.

The method may further include determining the threshold value, wherein the determining of the threshold value includes, based on a probability distribution difference of frequency selectivity information about cases that the UE candidate group set is adjusted by using each of a plurality of offsets, classifying the plurality of offsets into two or more groups, and, based on frequency selectivity information having a largest probability distribution difference in the frequency selectivity information for the two or more offsets, determining the threshold value.

The method may further include determining an activated bandwidth part (BWP) from among a plurality of BWPs and determining the threshold value corresponding to the activated BWP.

The frequency selectivity information between the representative channel and the other channels may include at least one of a root-mean-square error (RMSE) of a difference between the representative channel and the other channels, a variance of the difference, an average of an inner product value, a variance of the inner product value, a peak-to-average power ratio (PAPR), or a correlation.

Also, a method, performed by a user equipment (UE), for receiving data from a base station in a wireless communication system according to another embodiment of the disclosure includes: receiving a pilot signal from the base station, determining channel state information, based on the received pilot signal, transmitting the determined channel state information to the base station, and receiving, from the base station, data in case that the UE is included in a plurality of UEs scheduled by the base station based on frequency selectivity information between a representative channel selected from among channels of a plurality of carriers and other channels.

The receiving of the data may include receiving, from the base station, the data in case that the UE is included in the plurality of scheduled UEs as a result of comparing, by the base station, a frequency selectivity determined based on the channel state information with a pre-set threshold value.

The threshold value may be a threshold value corresponding to an activated bandwidth part (BWP) from among a plurality of BWPs.

The frequency selectivity information may include at least one of a root-mean-square error (RMSE) of a difference between the representative channel and the other channels, a variance of the difference, an average of an inner product value, a variance of the inner product value, a peak-to-average power ratio (PAPR), and a correlation.

Also, a base station for transmitting or receiving data to or from a user equipment (UE) in a wireless communication system according to another embodiment of the disclosure includes a transceiver configured to receive channel state information for channels of a plurality of carriers from a plurality of UEs, a memory configured to store a plurality of instructions, and at least one processor configured to execute the plurality of instructions, to determine a UE candidate group set based on the channel state information for the channels of the plurality of carriers, determine an offset used to adjust the number of UEs of the UE candidate group set, based on frequency selectivity information between a representative channel selected from among the channels of the plurality of carriers and other channels, and, based on the offset, determine a plurality of UEs to which data is to be transmitted, wherein the transceiver is further configured to transmit the data to the determined plurality of UEs.

Also, a user equipment (UE) for receiving data from a base station in a wireless communication system according to another embodiment of the disclosure includes a transceiver configured to receive a pilot signal from the base station, a memory configured to store a plurality of instructions, and at least one processor configured to execute the plurality of instructions, to determine channel state information, based on the received pilot signal, wherein the transceiver is further configured to transmit the determined channel state information to the base station, and receive data from the base station, when the UE is included in a plurality of UEs scheduled by the base station based on frequency selectivity information between a representative channel selected from among channels of a plurality of carriers and other channels.

MODE OF DISCLOSURE

Hereinafter, various embodiments of the disclosure will be described in detail with reference to the accompanying drawings.

In the following description of embodiments of the disclosure, descriptions of techniques that are well known in the art and not directly related to the disclosure are omitted. This is to clearly convey the gist of the disclosure by omitting an unnecessary description.

For the same reason, some elements in the drawings are exaggerated, omitted or schematically illustrated. In addition, the size of each element does not utterly reflect an actual size.

The advantages and features of the disclosure and methods of achieving the advantages and features will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

The singular forms "a," "an," and "the" are intended to include the plural forms as well, unless the context clearly indicates otherwise. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. In particular, numbers are examples for assisting understanding, and embodiments should not be understood as being limited by the numbers described.

As used herein, expressions such as "at least one of," when preceding a list of elements, modify the entire list of elements and do not modify the individual elements of the list. Throughout the disclosure, the expression "at least one of a, b and c" indicates only a, only b, only c, both a and b, both a and c, both b and c, all of a, b, and c, or variations thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

The term "~unit" used herein refers to a software component or a hardware component such as a field-programmable gate array (FPGA) or an application-specific integrated circuit (ASIC), which performs certain tasks. However, the term "~unit" does not mean to be limited to software or hardware. A "~unit" may be configured to be in an addressable storage medium or may be configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or may be further separated into additional components and "~units". Furthermore, components and "~units" may be implemented to operate one or more central processing units (CPUs) in a device or a secure multimedia card.

Hereinafter, terms for identifying access nodes, terms indicating network entities, terms indicating messages, terms indicating interfaces between network entities, and terms indicating various identification information used herein are exemplified for convenience of explanation. Accordingly, the disclosure is not limited to the terms described below, but other terms indicating objects having equal technical meanings may be used.

Hereinafter, some terms and names defined in the standards for $5^{th}$ generation (5G) or new radio (NR) and long-term evolution (LTE) systems may be used for convenience of explanation. However, the disclosure may not be limited to the terms and names, and may also be applied to systems following other standards.

That is, the detailed description of embodiments of the disclosure is made mainly based on communication standards defined by the $3^{rd}$ generation partnership project (3GPP), but based on determinations by those skilled in the art, the main idea of the disclosure may also be applied to other communication systems having similar technical backgrounds through some modifications without significantly departing from the scope of the disclosure.

The term "user equipment (UE)" used herein may not only include devices with wireless signal receivers having no transmission functions, but also include devices including both receiving and transmitting hardware which may perform bidirectional reception and transmission via a bidirectional communication link. Examples of the UE may include a personal computer (PC), a cellular phone, a smartphone, a TV, a tablet, a laptop, a personal digital assistant (PDA), a portable multimedia player (PMP), a navigation device, an MP3 player, a digital camera, a black box, a device mounted on a vehicle, a module in a device mounted on a vehicle, and a vehicle itself. However, examples of the UE are not limited thereto, and may include various devices.

The term "base station" used herein refers to an entity that allocates resources to a UE, and examples of the base station may include, but are not limited to, a gNode B, an eNode B, a Node B, a base station (BS), a radio access unit, a base station controller, a node on a network, and an access point.

A multi-user multiple input and multiple output (MU-MIMO) system is a MIMO system in a wireless communication system, and may transmit signals to a plurality of UEs in the same time-frequency resource through spatial multiplexing, to improve spectral efficiency. In the MU-MIMO system, user scheduling is required to select a UE to or from which data is to be transmitted or received from among all UEs existing in a communication area of a base station through spatial multiplexing for each transmission unit is required. That is, for each transmission unit, the base station may determine a UE to which or from which data is to be transmitted or received from among all of the UEs existing in the communication area of the base station, based on channel state information received from the plurality of UEs. In the MU-MIMO system using spatial multiplexing, a correlation between channels of the plurality of UEs transmitted in the same time-frequency resource may affect reception performance of each UE. Accordingly, the base station may perform multi-user scheduling by using multi-user diversity so that each UE obtains high reception performance, thereby improving transmission and reception performance.

Examples of a user scheduling algorithm may include an exhaustive search algorithm, a greedy user selection (GUS) algorithm, and a semi-orthogonal user selection (SUS) algorithm. Because the exhaustive search algorithm calculates and compares the number of all possible cases to select an optimal UE set that maximizes the performance of a system from all UE sets, and thus, the number of cases increases exponentially as the number of UEs increases, the exhaustive search algorithm may not be implemented due to computational complexity. The GUS algorithm may be an algorithm in which a UE with largest channel capacity is selected; when the corresponding UE is added to an existing UE set from among the remaining unselected UEs, a UE whose sum rate increases the most is added to a UE set; and the UE set to which data is to be transmitted is finally determined when a sum rate does not increase when compared to that of the existing UE set. The SUS algorithm may be an algorithm in which a UE with a largest channel norm value is selected; UE(s) having large orthogonality to the selected UE from among the unselected UEs are added to a UE set to which data is to be transmitted by a base station; and when the number of added UEs reaches a certain value or orthogonality does not exceed a certain value, the UE set to which data is to be transmitted is finally determined.

UE selection methods such as the GUS algorithm and the SUS algorithm may have good performance in a system using a narrowband or a single carrier assuming frequency flat fading. However, the UE selection methods may have poor performance in a frequency band in which frequency selective fading exists.

When a base station transmits data over a plurality of carriers by using multi-carrier transmission technology such as orthogonal frequency-division multiplexing (OFDM), each carrier may form a different MIMO channel. Also, because a plurality of UEs are scheduled over a plurality of carriers without scheduling a plurality of UEs for each carrier, the base station may determine one MIMO channel representing MIMO channels according to carriers in all frequency bands through which data is to be transmitted, in order to schedule the plurality of UEs. Also, the plurality of UEs may be scheduled by applying a user scheduling algorithm such as SUS or GUS based on the MIMO channel that is determined as a representative channel. Accordingly, when there is a frequency selectivity, a difference may occur between the representative channel and the MIMO channels according to carriers. Accordingly, in order to improve the performance of a user scheduler, the base station needs to consider frequency selectivity information that is not reflected by multi-user selection methods such as GUS and SUS.

FIG. 1 is a diagram for describing a structure of a communication system, according to an embodiment.

Referring to FIG. 1, a first base station 120 may communicate with a first UE 131, a second UE 132, a third UE 133, a fourth UE 134, a fifth UE 135, and a sixth UE 136 located in a communication area 110 of the first base station. Also, a second base station 150 may communicate with an $11^{th}$ UE 161, a $12^{th}$ UE 162, a $13^{th}$ UE 163, a $14^{th}$ UE 164, a $15^{th}$ UE 165, and a $16^{th}$ UE 166 located in a communication area 140 of the second base station. Also, a third base station 180 may communicate with a $21^{st}$ UE 191, a $22^{nd}$ UE 192, a $23^{rd}$ UE 193, a $24^{th}$ UE 194, a $25^{th}$ UE 195, and a $26^{th}$ UE 196 located in a communication area 170 of the third base station.

In an embodiment, the first base station 120 may transmit a pilot signal to the first UE 131 through the sixth UE 136 located in the communication area 110 of the first base station. The first UE 131 through the sixth UE 136 may determine channel state information for a channel of each carrier, based on the pilot signal, and may transmit the channel state information to the first base station 120. The first base station 120 may select a representative channel representing all bands from channels of a plurality of carriers, based on the channel state information for the channels of the plurality of carriers, and may determine a UE candidate group set, based on the selected representative channel. For example, the first base station 120 may determine the UE candidate group set by using an exhaustive search method, a greedy user selection (GUS) method, or a semi-orthogonal user selection (SUS) method, but a method of determining the UE candidate group set is not limited thereto. In an embodiment, the first base station 120 may determine the fourth UE 134, the fifth UE 135, and the sixth UE 136 as UEs in the UE candidate group set from among the first UE 131 through the sixth UE 136 located in the communication area 110 of the first base station. Also, the first base station 120 may determine an offset used to adjust the number of UEs of the UE candidate group set, based on frequency selectivity information between the representative channel and other channels. In an embodiment, the first base station 120 may determine that the offset is 0, when a frequency selectivity between the representative channel and the other channels corresponds to a threshold value. Accordingly, as a result of the adjusting of the UEs included in the UE candidate group set based on the offset, the fourth UE 134, the fifth UE 135, and the sixth UE 136 may be included in a plurality of scheduled UEs. The first base station 120 may finally transmit data to the fourth UE 134, the fifth UE 135 and the sixth UE 136.

In another embodiment, the second base station 150 may transmit a pilot signal to the $11^{th}$ UE 161 through the $16^{th}$ UE 166 located in the communication area 140 of the second base station. The $11^{th}$, UE 161 through the $16^{th}$ UE 166 may determine channel state information for a channel of each carrier, based on the pilot signal, and may transmit the channel state information to the second base station 150. The second base station 150 may select a representative channel representing all bands from channels of a plurality of carriers, based on the channel state information for the channels of the plurality of carriers, and may determine a UE candidate group set, based on the selected representative channel. For example, the second base station 150 may determine the UE candidate group set by using an exhaustive search method, a GUS method, or an SUS method, but a method of determining the UE candidate group set is not limited thereto. In an embodiment, the second base station 150 may determine the $14^{th}$ UE 164 and the $15^{th}$ UE 165 as UEs in the UE candidate group set from among the $11^{th}$ UE through the $16^{th}$ UE 166 located in the communication area 140 of the second base station. Also, the second base station 150 may determine an offset used to adjust the number of UEs of the UE candidate group set, based on frequency selectivity information between the representative channel and other channels. For example, the second base station 150 may determine that the offset is +1, when it is determined that a frequency selectivity between the representative channel and the other channels is small, is less than a threshold value, or is flat. Accordingly, the second base station 150 may additionally include a UE not included in the UE candidate group set into a plurality of scheduled UEs based on the offset determined to be +1. For example, as a result of adjusting the UEs included in the UE candidate group set based on the offset, the $14^{th}$ UE 164, the $15^{th}$ UE 165, and the $16^{th}$ UE 166 may be included in the plurality of scheduled UEs. That is, when it is determined that a frequency selectivity is small, is less than a threshold value, or is flat, the second base station 150 may determine that the $14^{th}$ UE 164, the $15^{th}$ UE 165, and the $16^{th}$ UE 166 obtained by adding the $16^{th}$ UE 166 to the plurality of scheduled UEs are a plurality of UEs to which data is to be transmitted, and may transmit data to the $14^{th}$ UE 164, the $15^{th}$ UE 165, and the $16^{th}$ UE 166.

In another embodiment, the third base station 180 may transmit a pilot signal to the $21^{st}$ UE 191 through the $26^{th}$ UE 196 located in the communication area 170 of the third base station. The $21^{st}$ UE 191 through the $26^{th}$ UE 196 may determine channel state information for a channel of each carrier, based on the pilot signal, and may transmit the channel state information to the third base station 180. The third base station 180 may select a representative channel representing all bands from channels of a plurality of carriers, based on the channel state information for the channels of the plurality of carriers, and may determine a UE candidate group set, based on the selected representative channel. For example, the third base station 180 may determine the UE candidate group set by using an exhaustive search method, a GUS method, or an SUS method, but a method of determining the UE candidate group set is not limited thereto. In an embodiment, the third base station 180 may determine the $21^{st}$ UE 191, the $22^{nd}$ UE 192, the $23^{rd}$ UE 193, and the $26^{th}$ UE 196 as UEs in the UE candidate group set from among the $21^{st}$ UE 191 through the $26^{th}$ UE 196 located in the communication area 170 of the third base station. Also, the third base station 180 may determine an offset used to adjust the number of UEs of the UE candidate group set, based on frequency selectivity information between the representative channel and other channels. For example, the third base station 180 may determine that the offset is −1, when it is determined that a frequency selectivity between the representative channel and the other channels is large, is greater than a threshold value, or is severe. For example, the third base station 180 may exclude the $26^{th}$ UE 196 included in the UE candidate group set from a plurality of scheduled UEs based on the offset determined to be −1. That is, as a result of adjusting UEs included in the plurality of scheduled UEs based on the offset, only the $21^{st}$, UE 191, the $22^{nd}$ UE 192, and the $23^{rd}$ UE 193 may be included in a plurality of UEs to which data is to be transmitted. Accordingly, when it is determined that a frequency selectivity is large, is greater than a threshold value, or is severe, the third base station 180 may determine that the $21^{st}$ UE 191, the $22^{nd}$ UE 192, and the $23^{rd}$ UE 193 obtained by excluding the $26^{th}$ UE 196 from the plurality of scheduled UEs are a plurality of UEs to which data is to be transmitted, and may transmit data to the $21^{st}$ UE 191, the $22^{nd}$ UE 192, and the $23^{rd}$ UE 193.

However, not all elements illustrated in FIG. 1 are essential elements of the structure of the communication system. The structure of the communication system may be implemented with more elements than those illustrated in FIG. 1 or may be implemented with fewer elements than those illustrated in FIG. 1. For example, although only the first UE 131 through the sixth UE 136 are illustrated in the communication area 110 of the first base station in FIG. 1, more or fewer UEs than the first UE 131 through the sixth UE 136 may be included in the communication area 110 of the first base station. Also, although an offset is −1, 0, or 1 in FIG. 1, the disclosure is not limited thereto, and the offset may be a value less or greater than −1, 0, or 1.

Figure 2:
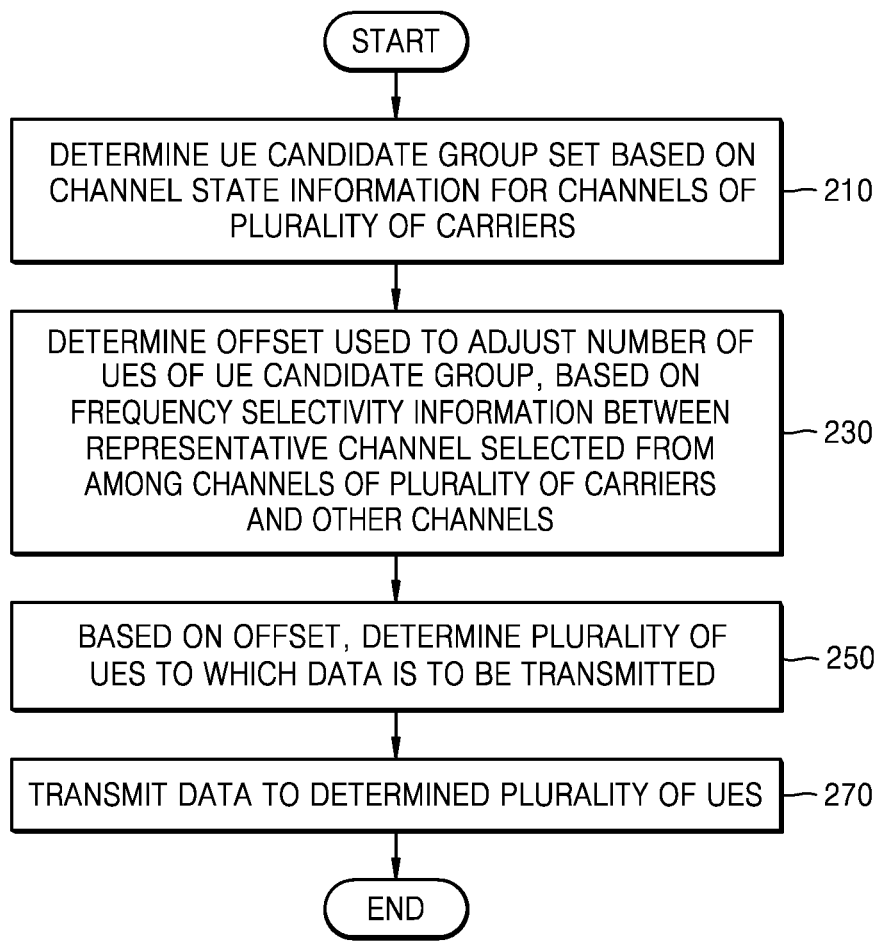
FIG. 2 is a flowchart illustrating a method by which a base station transmits and receives data by performing user scheduling, according to an embodiment.

FIG. 2 is a flowchart illustrating a method by which a base station transmits and receives data by performing user scheduling, according to an embodiment.

Referring to FIG. 2, in operation 210, a base station may determine a UE candidate group set based on channel state information for a plurality of carriers. In an embodiment, the base station may select a representative channel representing all bands for scheduling from among channels of the plurality of carriers, and may determine the UE candidate group set by performing user scheduling based on the channel state information and the selected representative channel. In an MU-MIMO system, an access point (AP) or the base station may improve reception performance of a plurality of UEs by using an appropriate user scheduling method. For example, the base station may determine the UE candidate group set by using a GUS method or an SUS method which guarantees sub-optimality and low complexity, but a method of determining the UE candidate group set is not limited thereto. However, because the base station performs user scheduling based on the representative channel, a difference may occur between the representative channel and other actual channels for carriers. For example, in a case where the base station determines the UE candidate group set by using the SUS method, when a frequency selectivity exists, UE(s) selected to have high spatial orthogonality to the representative channel may have low spatial orthogonality to actual channels for carriers. Accordingly, reception performance of the selected UE(s) may be degraded during spatial multiplexing.

In operation 230, the base station may select an offset used to adjust the number of UEs of the UE candidate group set, based on frequency selectivity information between the representative channel selected from among the channels of the plurality of carriers and other channels. That is, the base station may determine the UE candidate group set by using representative channel information, and then may determine the number of UEs of the UE candidate group set. In an embodiment, the frequency selectivity information may include, but is not limited to, a root-mean-square error (RMSE) indicating a difference between the representative channel and the other channels, a variance of the difference between the representative channel and the other channels, an average of an inner product value indicating directivity between the representative channel and the other channels, a variance of the inner product value, a peak-to-average power ratio (PAPR), and a correlation. For example, the base station may determine an offset used to determine the number of UEs by using PAPR and correlation values of actual channels. For example, when a frequency selectivity is greater than a threshold value, the base station may determine that the offset is a negative value and may reduce the number of UEs, and when a frequency selectivity is greater than a threshold value, the base station may determine that the offset is 0 or a positive value and may maintain or increase the number of UEs. According to an embodiment, when the base station determines the UE candidate group set based on the representative channel, the base station may additionally reflect the frequency selectivity information in an environment where a frequency selectivity exists, to improve the performance of a scheduler.

In operation 250, the base station may determine a plurality of UEs to which data is to be transmitted based on the offset. In an embodiment, when it is determined that the frequency selectivity is large, the base station may reduce the number of UEs, and when it is determined that the frequency selectivity is small, the base station may maintain or increase the number of UEs. Accordingly, when the base station adjusts the number of UEs, UEs to which data is to be transmitted by the base station may be adjusted. According to an embodiment, because the base station adjusts the number of UEs selected based on the representative channel according to a degree of a frequency selectivity, interference between UEs which may occur in actual channels may be reduced, and reception performance of each UE may be improved.

In operation 270, the base station may transmit data to the determined plurality of UEs. In an embodiment, the base station may determine a plurality of scheduled UEs by considering the offset, and may transmit data to the determined UEs through multi-antennas. According to an embodiment, when the frequency selectivity is large, the base station may reduce the number of UEs to reduce interference between UEs, and when the frequency selectivity is small, the base station may maintain or increase the number of UEs to improve reception performance of the plurality of UEs.

Although not shown in FIG. 2, in an embodiment, the base station may obtain frequency selectivity information including at least one of PAPR information and correlation information based on the channel state information, may determine a frequency selectivity based on the frequency selectivity information, may compare the frequency selectivity with a pre-set threshold value, and may determine an offset based on a result of the comparing.

Also, although not shown in FIG. 2, in an embodiment, based on the result of the comparing of the frequency selectivity with the pre-set threshold value, the base station may determine that the offset is a first offset when the frequency selectivity is greater than the threshold value and may determine that the offset is a second offset when the frequency selectivity is less than the threshold value, and may add the first offset or the second offset to the number of UEs of the UE candidate group set, to increase the number of UEs of the UE candidate group set when the frequency selectivity is greater than the threshold value and reduce the number of UEs of the UE candidate group set when the frequency selectivity is less than the threshold value. Accordingly, the base station may determine a plurality of UEs to which data is to be transmitted, based on the reduced or increased number of UEs.

Also, although not shown in FIG. 2, in an embodiment, based on a probability distribution difference of frequency selectivity information about cases that the UE candidate group set is adjusted by using each of a plurality of offsets, the base station may classify the plurality of offsets into two or more groups, and, based on frequency selectivity information having a largest probability distribution difference in the frequency selectivity information for the two or more groups, the base station may determine a threshold value.

Also, although not shown in FIG. 2, in an embodiment, the base station may determine an activated bandwidth part (BWP) from among a plurality of BWPs, and may determine a threshold value corresponding to the activated BWP.

Figure 3:
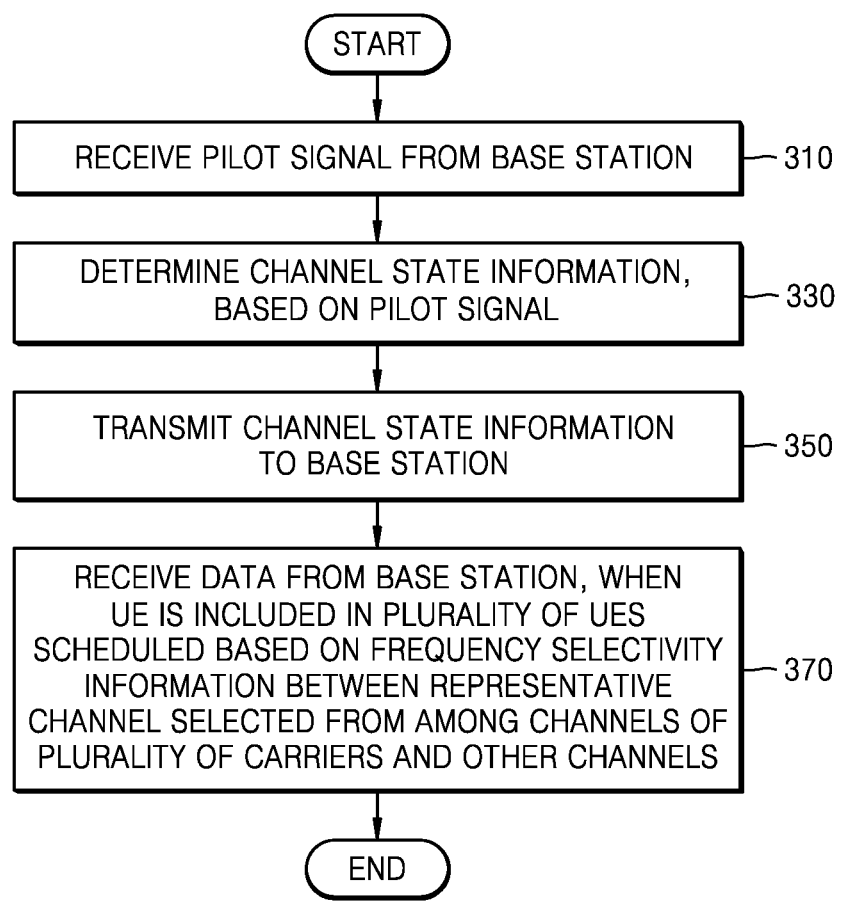
FIG. 3 is a flowchart illustrating a method by which a user equipment (UE) receives data from a base station, according to an embodiment.

FIG. 3 is a flowchart illustrating a method by which a UE receives data from a base station, according to an embodiment.

Referring to FIG. 3, in operation 310, a UE capable of receiving data from a base station in a wireless communication system may receive a pilot signal from the base station. For example, in a 5G communication system or an NR communication system, the base station may transmit, to the UE, a pilot signal mapped to a basic unit beam having a relatively narrow beamwidth in different directions through a reference signal such as a midamble for downlink. Accordingly, the UE may measure channel quality of a particular single beam or one or more overlapped beams from the pilot signal mapped to each unit beam of the narrow beamwidth transmitted from the base station in the different directions.

In operation 330, the UE may determine channel state information (CSI), based on the pilot signal. In an embodiment, the UE may estimate a channel state based on the pilot signal, and may determine the CSI for feedback to the base station.

In operation 350, the UE may transmit the CSI to the base station. In an embodiment, the UE may transmit the CSI to the base station, so that information about the channel state of downlink may be fed back to the base station.

In operation 370, the UE may receive data from the base station, when the UE is included in a plurality of UEs scheduled based on frequency selectivity information between a representative channel selected from among channels of a plurality of carriers and other channels. In an embodiment, because the base station additionally considers a frequency selectivity in scheduling UEs, even when the frequency selectivity exists, the disadvantage that the performance of the plurality of UEs selected based on the representative channel is degraded in actual MIMO channels for carriers due to a difference between the representative channel and other channels for carriers may be overcome.

Although not shown, in an embodiment, the UE may receive data from the base station, when the UE is included in the plurality of scheduled UEs, as a result obtained when the base station compares the frequency selectivity determined based on the CSI with a pre-set threshold value.

Also, although not shown in FIG. 3, in an embodiment, the threshold value may be a threshold value corresponding to an activated BWP from among a plurality of BWPs.

Also, although not shown in FIG. 3, in an embodiment, the frequency selectivity information may include an RMSE of a difference between the representative channel and the other channels, a variance of the difference, an average of an inner product value, a variance of the inner product value, a PAPR, and a correlation.

Figure 4:
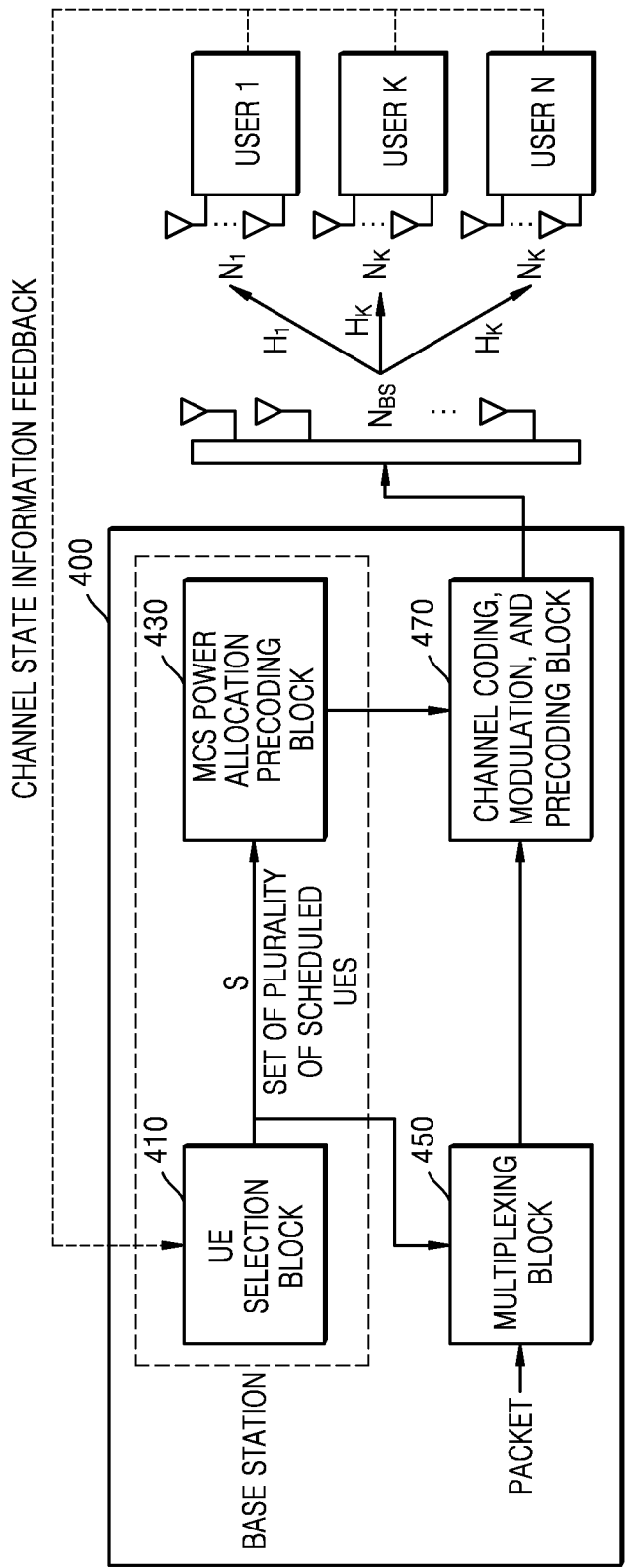
FIG. 4 is a block diagram illustrating a method by which a base station transmits data to a plurality of UEs by performing user scheduling, according to an embodiment.

FIG. 4 is a block diagram illustrating a method by which a base station transmits data to a plurality of UEs by performing user scheduling, according to an embodiment.

Referring to FIG. 4, in a UE selection block 410, a base station 400 may select a set S of a plurality of scheduled UEs by executing a UE selection algorithm based on CSI fed back from each UE. In an embodiment, in the UE selection block 410, the base station may determine a UE candidate group set S* based on a representative channel, and then may adjust the number L* of UEs of the UE candidate group set S* based on frequency selectivity information between the representative channel and other channels. The base station 400 may select the representative channel based on the CSI fed back from a plurality of UEs, and may determine a maximum UE set Σ* corresponding to a maximum number of UEs that may be supported by an MU-MIMO system through spatial multiplexing. Also, the base station 400 may determine how many UEs are to be selected from among the UEs of the maximum UE set Σ*, that is, the number L* of UEs constituting the UE candidate group set S*. Also, the base station 400 may select the UE candidate group set S based on the representative channel and the number L* of UEs, and may calculate frequency selectivity information between the representative channel and the other channels based on the CSI received from the plurality of UEs of the maximum UE set Σ*. The base station 400 may determine the set S of the plurality of scheduled UEs including L UEs as a result of adjusting the number L* of UEs constituting the UE candidate group set S* based on the frequency selectivity. In an embodiment, the UE selection block 410 corresponds to a UE selection block 500 described below in FIG. 5, and thus, will be described in detail in FIG. 5.

In a modulation and coding scheme (MCS) power allocation precoding block 430, the base station 400 may perform MCS power allocation precoding based on the CSI received from the plurality of UEs. In order to obtain optimal channel capacity in a multi-antenna system, the base station 400 may differently transmit an MCS and power transmission allocation for each transmittable layer. Accordingly, the base station 400 may determine the performance of each antenna based on the CSI fed back from the plurality of UEs, and then may perform MCS power allocation precoding by adding a weight to an antenna having good performance or an antenna having a good channel state.

In a multiplexing block 450, the base station 400 may perform spatial multiplexing to increase transmission capacity, by using the set S of the plurality of scheduled UEs and packets to be transmitted. That is, the base station 400 may simultaneously transmit multiple independent data streams to the set S of the plurality of scheduled UEs through spatially separated multiple channels. According to an embodiment, the base station 400 may perform spatial multiplexing to transmit different data to a plurality of antennas by using a single frequency, thereby increasing transmittable capacity by the number of antennas and improving spectral efficiency.

In a channel coding, modulation, and precoding block 470, the base station 400 may perform channel coding, modulation, precoding, etc. so that a receiving side detects and/or corrects an error during transmission of data through a channel. That is, the base station 400 may perform blocking coding and convolutional coding, may perform modulation to obtain a waveform corresponding to a data stream, and may apply a precoding method such as a zero-forcing (ZF) method of increasing the strength of a signal of data toward each UE or reducing the strength of a signal acting as interference with each other by reflecting channel environments of a plurality of UEs.

Operations of the MCS power allocation precoding block 430, the multiplexing block 450, and the channel coding, modulation, and precoding block 470 described with reference to FIG. 4 may be performed by using methods other than the method described in the disclosure, and are not limited to the method of the disclosure.

Figure 5:
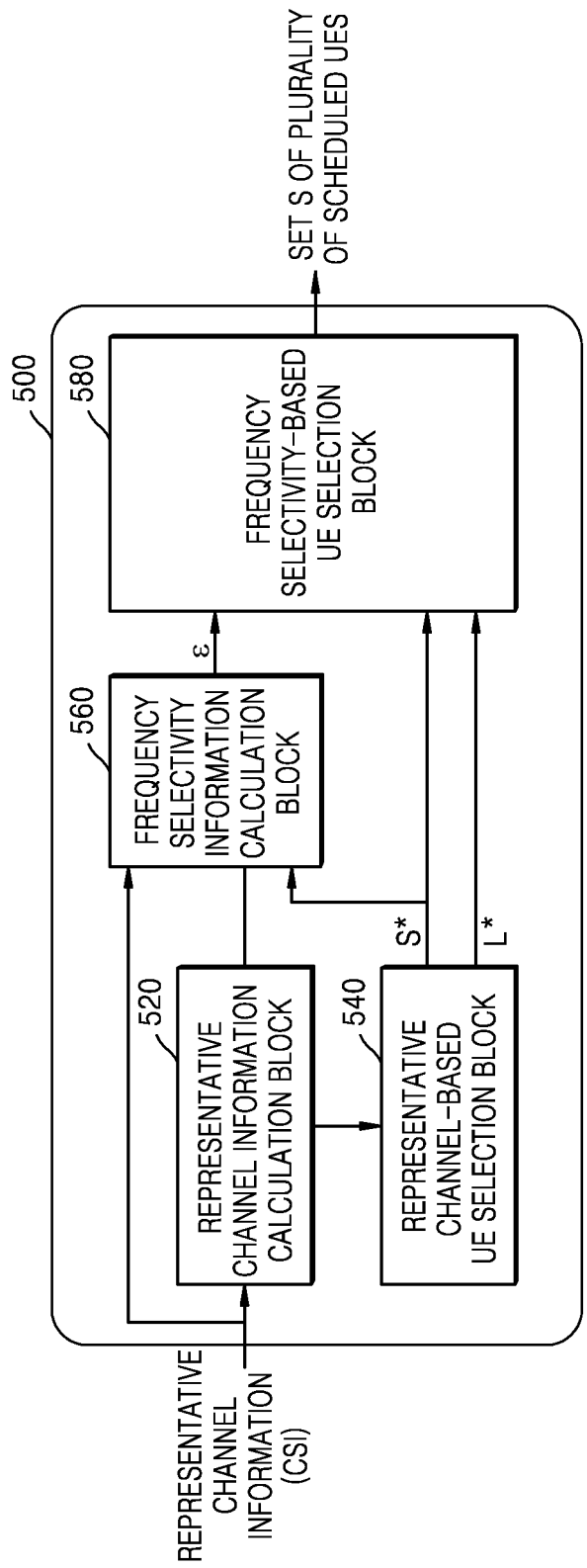
FIG. 5 is a block diagram illustrating a method by which a base station selects a plurality of UEs by considering a frequency selectivity, according to an embodiment.

FIG. 5 is a block diagram illustrating a method by which a base station selects a plurality of UEs by considering a frequency selectivity, according to an embodiment.

Referring to FIG. 5, in the UE selection block 500, a base station may determine a set S of a plurality of scheduled UEs based on CSI received from a plurality of UEs. In an embodiment, the UE selection block 500 may include a representative channel information calculation block 520, a representative channel-based UE selection block 540, a frequency selectivity information calculation block 560, and a frequency selectivity-based UE selection block 580.

In the representative channel information calculation block 520, the base station may determine a representative channel based on the CSI received from the plurality of UEs. In an embodiment, the base station may determine one representative channel representing all bands for scheduling based on the CSI for channels of a plurality of carriers. For example, the representative channel may be a channel of a carrier located at the center of a frequency band or a channel having a largest size from among the channels of the plurality of carriers, but the disclosure is not limited thereto.

In the representative channel-based UE selection block 540, the base station may determine a UE candidate group set S* and the number L* of UEs constituting the UE candidate group set S* by using the representative channel calculated in the representative channel information calculation block 520. In an embodiment, the base station may select a maximum UE set Σ* including a maximum number of UEs which may be supported by an MU-MIMO system through spatial multiplexing, and may determine how many UEs are to be selected in the maximum UE set Σ*, that is, the number L* of UEs constituting the UE candidate group set S*. The base station may determine the UE candidate group set S*, based on the number L* of UEs. For example, examples of a method of selecting the UE candidate group set S* by considering the representative channel may include, but are not limited to, a GUS method and an SUS method.

In the frequency selectivity information calculation block 560, the base station may calculate the frequency selectivity information between the representative channel and other channels based on the CSI received from the plurality of UEs of the maximum UE set Σ*, the representative channel, and the UE candidate group set S*. Also, the base station may determine a frequency selectivity ε by using the frequency selectivity information. In an embodiment, the base station may calculate the frequency selectivity information, based on representative channel information calculated for the maximum UE set Σ* including the maximum number of UEs and the CSI for each channel of the maximum UE set Σ*. Also, the base station may determine the frequency selectivity ε based on the frequency selectivity information. Examples of the frequency selectivity information may include, but are not limited to, an RMSE indicating a difference between the representative channel and the other channels, a variance of the difference between the representative channel and the other channels, an average of an inner product value between the representative channel and the other channels, a variance of the inner product value, a PAPR, a correlation, and a spatial correlation coefficient. In an embodiment, the base station may determine appropriate frequency selectivity information, by using probability distributions of various values indicating the channels of the plurality of carriers.

In the frequency selectivity-based UE selection block 580, the base station may adjust the number L* of UEs constituting the UE candidate group set S* determined by considering the representative channel, based on the frequency selectivity ε. In an embodiment, the base station may determine the final number L of UEs and the set S of the plurality of scheduled UEs, by additionally considering an offset to the number L* of UEs of the UE candidate group set S*. The base station may determine that the offset is a first offset when the frequency selectivity ε is greater than a threshold value, and may determine that the offset is a second offset when the frequency selectivity ε is less than the threshold value, and may determine that the final number L of UEs is a value calculated by considering the offset in addition to the number L* of UEs of the UE candidate group set S*. For example, the base station may determine that the final number L of UEs is a value (L=L*+offset) calculated by adding the offset to the number L* of UEs of the UE candidate group set S*. Accordingly, the base station may determine that the offset is a negative value when the frequency selectivity ε is greater than a threshold value, and may determine that the offset is a positive value or 0 when the frequency selectivity ε is less than the threshold value. Accordingly, the final number L of UEs may be a value obtained by adding the offset to the number L* of UEs of the UE candidate group set S*. That is, the base station may efficiently schedule the plurality of UEs, by reducing the number of UEs when the frequency selectivity ε is large, and increasing or maintaining the number of UEs when the frequency selectivity ε is small.

Figure 6:
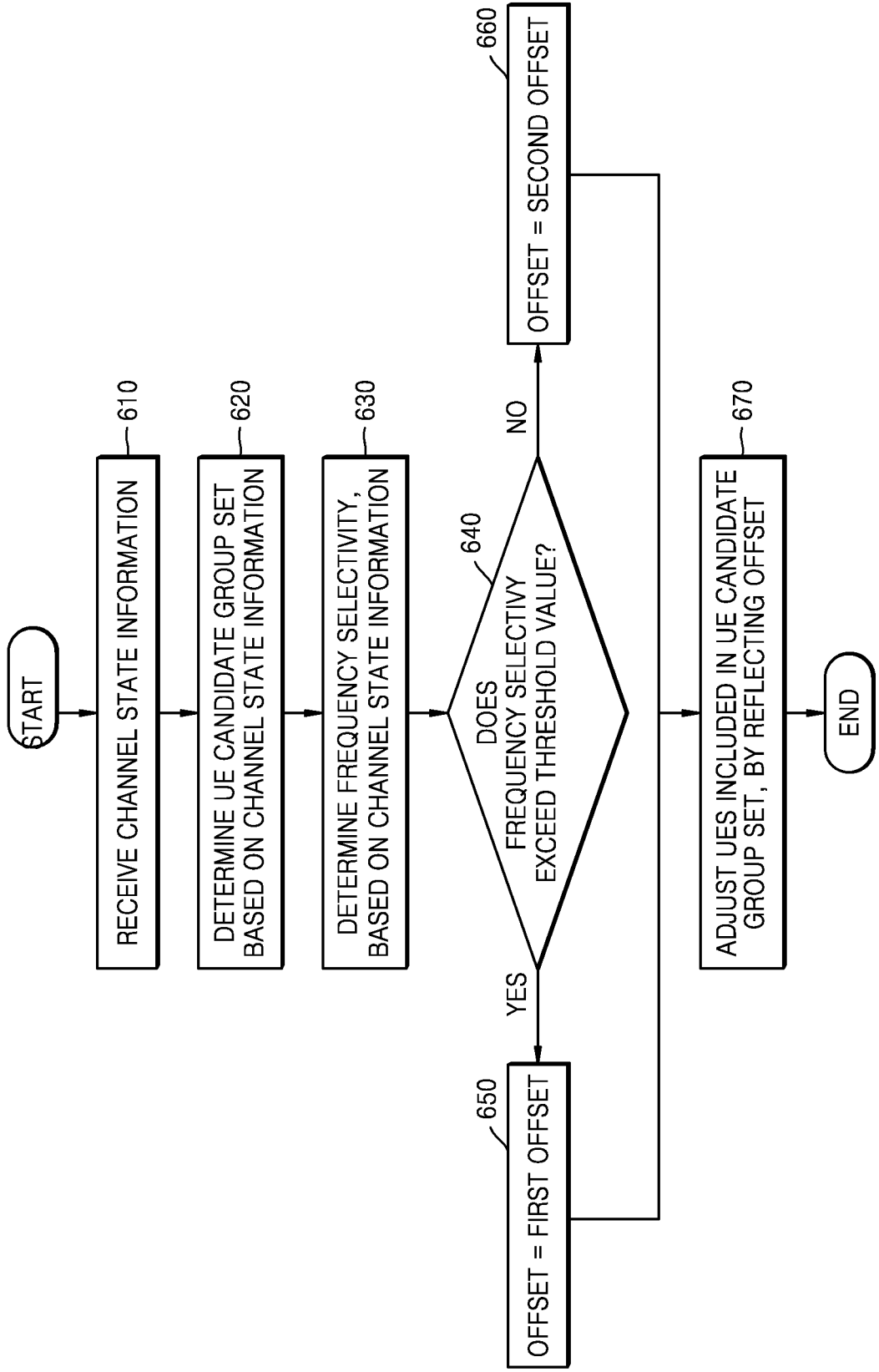
FIG. 6 is a block diagram illustrating a method by which a base station adjusts the number of UEs of a UE candidate group set by comparing a frequency selectivity with a threshold value, according to an embodiment.

FIG. 6 is a block diagram illustrating a method by which a base station adjusts the number of UEs of a UE candidate group set by comparing a frequency selectivity with a threshold value, according to an embodiment.

Referring to FIG. 6, in operation 610, a base station may receive CSI from a plurality of UEs. In an embodiment, the base station may transmit a pilot signal to the plurality of UEs, and each UE may estimate the CSI based on the pilot signal. Also, each UE may transmit its estimated CSI to the base station.

In operation 620, the base station may determine a UE candidate group set S* based on the CSI. In an embodiment, the base station may select a representative channel representing all bands for scheduling from channels of a plurality of carriers, and may determine the UE candidate group set S* and the number L* of UEs constituting the UE candidate group set S* by performing a user scheduling operation. That is, the base station may select a maximum UE set Σ* of a maximum number of UEs which may be supported by an MU-MIMO system through spatial multiplexing, and may determine how many UEs are to be selected in the maximum UE set Σ*, that is, the number L* of UEs. For example, the base station may determine the UE candidate group set S* by using a GUS method, an SUS method, or a random orthogonal beamforming (RBF) method which guarantees sub-optimality and low complexity, but a method of manufacturing the UE candidate group set S* is not limited thereto.

In operation 630, the base station may calculate frequency selectivity information based on the CSI, and may determine a frequency selectivity ε by using the calculated frequency selectivity information. In an embodiment, the base station may calculate the frequency selectivity ε by considering the CSI received from the plurality of UEs of the maximum UE set Σ*, the representative channel, and the UE candidate group set S* selected by considering the representative channel. Examples of the frequency selectivity information may include, but are not limited to, an RMSE indicating a difference between the representative channel and other channels, a variance of the difference between the representative channel and the other channels, an average of an inner product value between the representative channel and the other channels, a variance of the inner product value, a PAPR, a correlation, and a spatial correlation coefficient. In an embodiment, the base station may determine appropriate frequency selectivity information, by using probability distributions of various values indicating the channels of the plurality of carriers.

In operation 640, the base station may determine whether the frequency selectivity ε exceeds a threshold value $\varepsilon_o$. In an embodiment, when the frequency selectivity ε exceeds the threshold value $\varepsilon_o$, that is, when $\varepsilon > \varepsilon_o$, in operation 650, the base station may determine that an offset is a first offset, and when the frequency selectivity ε does not exceed the threshold value $\varepsilon_o$, that is, when $\varepsilon \leq \varepsilon_o$, in operation 660, the base station may determine that the offset is a second offset. Also, in an embodiment, the base station may determine the threshold value $\varepsilon_o$ for the frequency selectivity ε

In an embodiment, based on a probability distribution difference of frequency selectivity information about cases that the UE candidate group set is adjusted by using each of a plurality of offsets, the base station may classify the plurality of offsets into two or more groups, and, based on frequency selectivity information having a largest probability distribution difference in the frequency selectivity information for the two or more groups, the base station may determine the threshold value $\varepsilon_o$. For example, the base station may determine the threshold value $\varepsilon_o$ by using a probability cumulative distribution function (CDF) of the frequency selectivity information for each of the plurality of offsets. A method of determining the threshold value $\varepsilon_o$ by using the probability CDF will be described in detail with reference to FIG. 8B.

In another embodiment, the base station may determine an activated BWP from among a plurality of BWPs, and may determine the threshold value $\varepsilon_o$ corresponding to the activated BWP. That is, the base station may determine the threshold value $\varepsilon_o$, for example, by considering characteristics of the activated BWP. In another embodiment, the base station may determine the threshold value $\varepsilon_o$ by considering both the probability CDF of the frequency selectivity information for each of the plurality of offsets and the characteristics of the activated BWP.

In operation 670, the base station may adjust UEs included in the UE candidate group set S* by reflecting the offset. For example, the base station may determine the final number L of UEs by adding the offset determined in operation 650 or operation 660 to the number L* of UEs of the UE candidate group set S*. That is, L=L*+offset. In an embodiment, when the frequency selectivity $\varepsilon$ exceeds the threshold value $\varepsilon_o$ and the base station determines that the frequency selectivity $\varepsilon$ is large, the base station may reduce the number L* of UEs of the UE candidate group set S*, by considering the first offset. Also, when the frequency selectivity $\varepsilon$ does not exceed the threshold value $\varepsilon_o$ and the base station determines that the frequency selectivity $\varepsilon$ is small or appropriate, the base station may increase or maintain the number L* of UEs of the UE candidate group set S*, by considering the second offset. According to an embodiment, the base station may efficiently transmit data to the plurality of UEs by additionally considering the frequency selectivity $\varepsilon$, based on the UE candidate group set S*that does not reflect a degree of the frequency selectivity. For example, when the frequency selectivity $\varepsilon$ exceeds the threshold value $\varepsilon_o$, the base station may determine that the offset is −2 that is the first offset. Also, the base station may reduce the number L* of UEs of the UE candidate group set S* by 2, by considering the first offset. In an embodiment, although the offset is described as −2, the offset is not limited thereto, and may be a smaller negative value, a larger negative value, 0, or a positive value.

FIG. 7 is a diagram illustrating a method by which a base station transmits data to some of a plurality of UEs by adjusting UEs included in a UE candidate group set, based on CSI received from the plurality of UEs, according to an embodiment.

Referring to FIG. 7, in operation 710, a base station 702 may transmit a pilot signal to a plurality of UEs including a first UE 704, a second UE 706, and a third UE 708 so that the plurality of UEs each estimate a channel state with the base station. In an embodiment, operation 710 may correspond to operation 310 of FIG. 3.

In operation 720, the first UE 704, the second UE 706, and the third UE 708 may each estimate a channel state based on the pilot signal, and may transmit CSI to the base station 702. In an embodiment, operation 720 may correspond to operations 330 through 350 of FIG. 3.

In operation 730, the base station 702 may determine a UE candidate group set, based on the CSI. In an embodiment, the base station 702 may select a representative channel based on the CSI, and may determine the UE candidate group set by performing user scheduling based on the representative channel. For example, the base station 702 may use a GUS method or an SUS method as a user scheduling method, but the disclosure is not limited thereto. For example, the base station 702 may determine a channel with the first UE 704 as the representative channel, based on the CSI received from the first UE 704, the second UE 706, and the third UE 708. Also, the base station 702 may include the first UE 704 and the second UE 706 in the UE candidate group set, based on the representative channel.

In operation 740, the base station may determine an offset used to adjust the number of UEs, based on frequency selectivity information between the representative channel selected from among channels of a plurality of carriers and other channels. That is, after the base station 702 determines the UE candidate group set by using representative channel information, the base station may determine the number of UEs in the UE candidate group set based on the frequency selectivity information. In an embodiment, examples of the frequency selectivity information may include, but are not limited to, an RMSE indicating a difference between the representative channel and the other channels, a variance of the difference between the representative channel and the other channels, an average of an inner product value indicating directivity between the representative channel and the other channels, a variance of the inner product value, a PAPR, and a correlation. For example, the base station may determine the offset used to determine the number of UEs by using PAPR and correlation values of actual channels. According to an embodiment, when the base station 702 determines the UE candidate group set based on the representative channel, the performance of a scheduler may be improved by additionally reflecting the frequency selectivity information in an environment where a frequency selectivity exists. For example, based on the frequency selectivity information between the representative channel and the other channels, the base station 702 may determine that the frequency selectivity is large, is greater than a threshold value, or is severe. Accordingly, the base station 702 may determine that the offset is a negative value.

In operation 750, the base station 702 may adjust UEs included in the UE candidate group set. In an embodiment, when the frequency selectivity is large, the base station 702 may determine that the offset is a negative value and may reduce the number of UEs, and when the frequency selectivity is small, the base station 702 may determine that the offset is 0 or a positive value and may maintain or increase the number of UEs. For example, the base station 702 may adjust the number of UEs by considering the offset in the UE candidate group set including the first UE 704 and the second UE 706 determined in operation 730. The base station 702 may determine that the frequency selectivity is large or severe, based on the frequency selectivity information between a channel of the first UE 704 that is the representative channel and channels of the first UE 704, the second UE 706, and the third UE 708. Accordingly, as a result obtained after the base station 702 determines that the offset is a negative value and adjusts the number of UEs of the UE candidate group set, only the first UE 704 may be determined as a final UE.

In operation 760, the base station 702 may transmit data to the first UE 704 that is determined as the final UE. In an embodiment, the base station 702 should transmit data to the first UE 704 and the second UE 706 when the offset is not considered. However, as a result of determining that the frequency selectivity is large, the base station 702 may reduce the number of scheduled UEs and may transmit data only to the first UE 704. According to an embodiment, because the number of UEs is adjusted according to the frequency selectivity, a degree of interference between the scheduled UEs may be reduced.

Figure 8A:
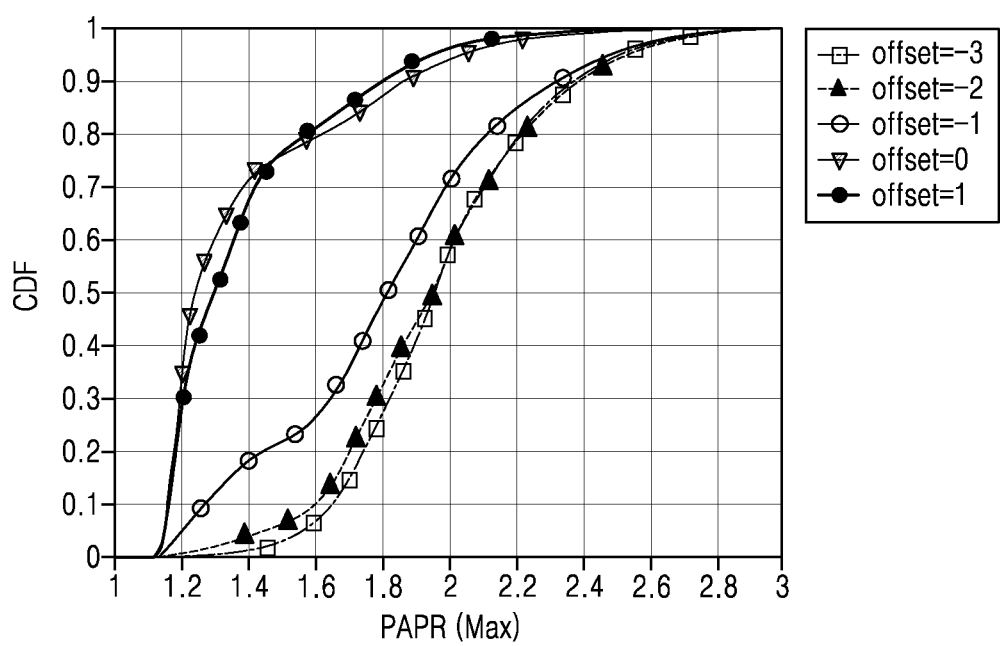
FIG. 8A is a diagram illustrating a probability cumulative distribution function of frequency selectivity information for each of a plurality of offsets, according to an embodiment.

FIG. 8A is a diagram illustrating a probability CDF of frequency selectivity information for each of a plurality of offsets, according to an embodiment.

Referring to FIG. 8A, appropriate frequency selectivity information may be selected by using a probability CDF of frequency selectivity information for each of a plurality of offsets may be selected. In an embodiment, a base station may determine frequency selectivity information having a difference between probability CDFs according to each offset as the offset changes is frequency selectivity information for determining an offset value. For example, the base station may consider a CDF of a PAPR value of a channel according to an offset when the offset is −3, −2, −1, 0, or +1. Also, the base station may determine that offset characteristics may be divided into two groups, based on the CDFs. That is, when offset characteristics may be divided into first characteristics when the offset is −3, −2, and −1, and second characteristics when the offset is 0 and +1. Accordingly, the base station may select that a maximum value from among PAPR values of UEs in a UE candidate group set is frequency selectivity information clearly indicating a difference between the first characteristics and the second characteristics.

Figure 8B:
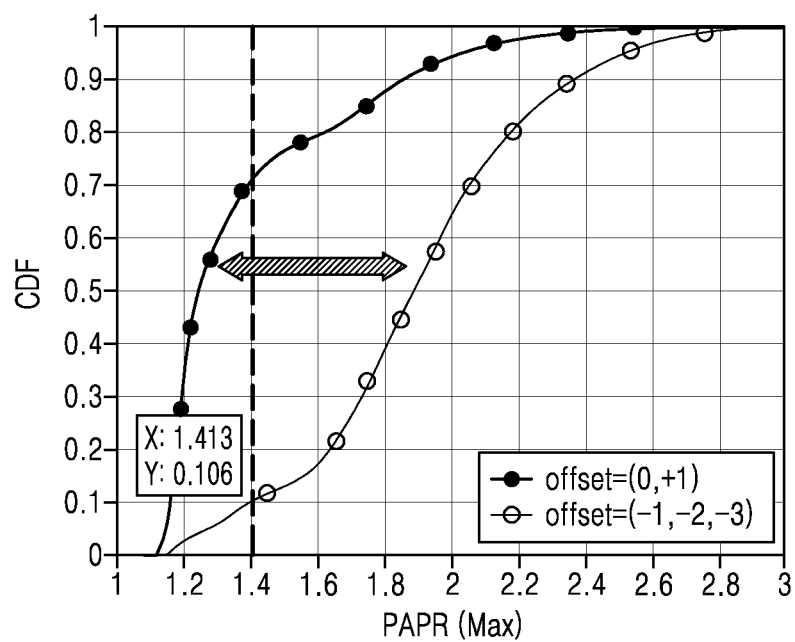
FIG. 8B is a diagram illustrating a method of setting a threshold value by using probability cumulative distribution functions of frequency selectivity information, according to an embodiment.

FIG. 8B is a diagram illustrating a method of setting a threshold value by using probability CDFs of frequency selectivity information, according to an embodiment. Referring to FIG. 8A, offset characteristics may be divided into first characteristics when an offset is −3, −2, and −1 and second characteristics when the offset is 0 and +1. In an embodiment, a base station may determine a threshold value of a frequency selectivity, based on a CDF of a PAPR according to the first characteristics and a CDF of a PAPR according to the second characteristics. The base station may determine that a value of frequency selectivity information having a largest difference between the CDF of the frequency selectivity information according to the first characteristics and the CDF of the frequency selectivity information according to the second characteristics is a threshold value. For example, the base station may determine that 1.413 that is a PAPR value having a largest difference between the CDF of the PAPR according to the first characteristics and the CDF of the PAPR according to the second characteristics is a threshold value. Accordingly, when a value of the PAPR between a representative channel selected from among channels of a plurality of carriers and other channels is greater than 1.413, the base station may determine that the offset is −1, −2 or −3, and when a value of the PAPR is less than 1.413, the base station may determine that the offset is 0 or 1. Accordingly, when it is determined that the frequency selectivity is large, the base station may reduce the number of UEs in the UE candidate group set, and when it is determined that the frequency selectivity is small, the base station may increase or maintain the number of UEs in the UE candidate group set.

Figure 9:
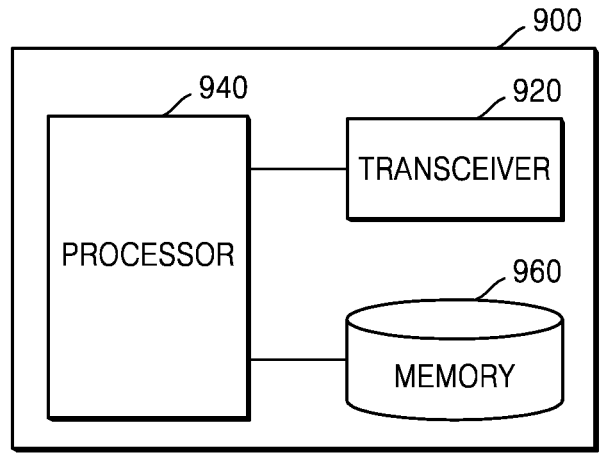
FIG. 9 is a diagram illustrating a detailed configuration of a base station in a wireless communication system, according to an embodiment.

FIG. 9 is a diagram illustrating a detailed configuration of a base station in a wireless communication system, according to an embodiment.

Referring to FIG. 9, a base station 900 may include a transceiver 920, a processor 940, and a memory 960. However, not all elements illustrated in FIG. 9 are essential elements of the base station 900. The base station 900 may be implemented with more elements that those illustrated in FIG. 9 or may be implemented with fewer elements that those illustrated in FIG. 9. In addition, the transceiver 920, the processor 940, and the memory 960 may be implemented as one chip.

In an embodiment, the transceiver 920 may transmit and receive a signal to and from a UE or another electronic device connected by wire or wirelessly to the base station 900. The signal may include control information and data. For example, the transceiver 920 may transmit a pilot signal to a plurality of UEs, and may receive CSI of channels of a plurality of carriers from the plurality of UEs. Also, the transceiver 920 may transmit data to UEs scheduled by considering a frequency selectivity.

In an embodiment, the processor 940 may control an overall operation of the base station 900, and may include at least one processor such as a CPU or a graphics processing unit (GPU). The processor 940 may control other elements included in the base station 900 to perform an operation for operating the base station 900. For example, the processor 940 may execute a program stored in the memory 960, may read a stored file, or may store a new file. In an embodiment, the processor 940 may perform an operation for operating the base station 900, by executing a program stored in the memory 960. For example, the processor 940 may determine a UE candidate group set based on the CSI for the channels of the plurality of carriers, may determine an offset used to adjust the number of UEs of the UE candidate group set based on frequency selectivity information between a representative channel selected from among the channels of the plurality of carriers and other channels, and may determine a plurality of UEs to which data is to be transmitted based on the offset.

In an embodiment, a program such as an application and various types of data such as a file may be installed and stored in the memory 960. The processor 940 may access and use data stored in the memory 960, or may store new data in the memory 960. In an embodiment, the memory 960 may store a threshold value for determining the offset.

Figure 10:
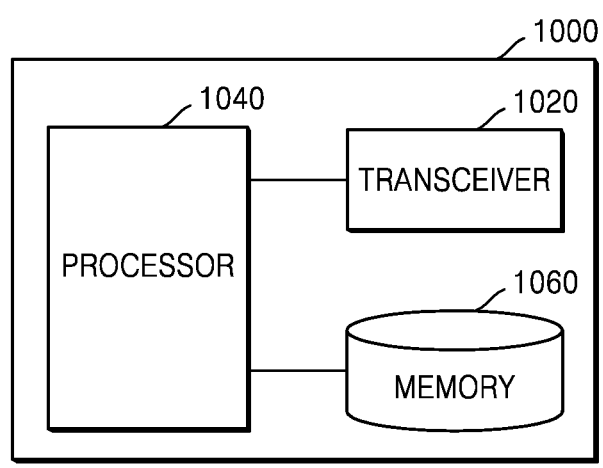
FIG. 10 is a diagram illustrating a detailed configuration of a UE in a wireless communication system, according to an embodiment.

FIG. 10 is a diagram illustrating a detailed configuration of a UE in a wireless communication system, according to an embodiment.

Referring to FIG. 10, a UE 1000 may include a transceiver 1020, a processor 1040, and a memory 1060. However, not all elements illustrated in FIG. 10 are essential elements of the UE 1000. The UE 1000 may include more or fewer elements than those illustrated in FIG. 10. In addition, the transceiver 1020, the processor 1040, and the memory 1060 may be implemented as one chip.

In an embodiment, the transceiver 1020 may transmit and receive a signal to and from a base station or another electronic device connected by wire or wirelessly to the UE 1000. The signal may include control information and data. The transceiver 1020 may receive a signal through a radio channel and may output the signal to the processor 1040, and may transmit a signal output from the processor 1040 through the radio channel. For example, the transceiver 1020 may receive a pilot signal from the base station, and the processor 1040 may process the received pilot signal and may output CSI by estimating a channel state. Accordingly, the transceiver 1020 may transmit the CSI to the base station. Also, the transceiver 1020 may receive data from the base station, when the UE 1000 is included in a plurality of UEs scheduled by the base station based on frequency selectivity information between a representative channel from among channels of a plurality of carriers and other channels.

In an embodiment, the processor 1040 may control an overall operation of the UE 1000, and may include at least one processor such as a CPU or a GPU. The processor 1040 may control other elements included in the UE 1000 to perform an operation for operating the UE 1000. For example, the processor 1040 may execute a program stored in the memory 1060, read a stored file, or store a new file. In an embodiment, the processor 1040 may perform an operation for operating the UE 1000, by executing a program stored in the memory 1060. For example, the processor 1040 may determine the CSI based on the pilot signal received from the base station.

In an embodiment, a program such as an application and various types of data such as a file may be installed and stored in the memory 1060. The processor 1040 may access and use data stored in the memory 1060, or may store new data in the memory 1060. That is, the memory 1060 may store a program and data required to operate the UE 1000. Also, the memory 1060 may store control information or data included in a signal obtained by the UE 1000. The memory 1060 may include a storage medium such as a read-only memory (ROM), a random-access memory (RAM), a hard-disk, a compact disc (CD)-ROM, or a digital versatile disc (DVD), or a combination thereof.

The disclosure may be embodied as a computer-readable recording medium including instructions that may be executed in computers, e.g., a program module executed in computers. A computer-readable medium may be an arbitrary available medium accessible by a computer, and examples thereof may include all volatile and nonvolatile media and separable and non-separable media. Further, examples of the computer-readable medium may include computer storage media. The computer storage medium includes all volatile/nonvolatile and separable/non-separable media embodied by a certain method or technology for storing information such as computer-readable instructions, a data structure, a program module, or other data.

The embodiments of the disclosure described above may be implemented as a software (S/W) program including instructions stored in a computer-readable storage medium.

A computer may be a device for calling the instructions stored in the computer-readable storage medium and performing, in response to the called instructions, operations according to the embodiments of the disclosure described above, and may include an electronic device according to the embodiments of the disclosure.

The computer-readable storage medium may be provided in the form of a non-transitory storage medium. Here, 'non-transitory' means that the storage medium does not include a signal and is tangible, but does not distinguish whether data is stored semi-permanently or temporarily in the storage medium.

Also, a control method according to the disclosed embodiments may be provided in a computer program product. The computer program product is a product purchasable between a seller and a purchaser.

The computer program product may include an S/W program and a computer-readable storage medium in which the S/W program is stored. For example, the computer program product may include a S/W program-type product (e.g., a downloadable application) electronically distributed through a manufacturer of the device or an electronic market (e.g., Google Play store or App Store). For electronic distribution, at least a portion of the S/W program may be stored in a storage medium or temporarily generated. In this case, the storage medium may be a server of the manufacturer, a server of the electronic market, or a storage medium of a relay server that temporarily stores the S/W program.

The computer program product may include a storage medium of a server or a storage medium of a device in a system including the server and the device. Alternatively, when there is a third device (e.g., a smartphone) connected to the server or the device for communication, the computer program product may include a storage medium of the third device. Alternatively, the computer program product may include a software program itself transmitted from the server to the device or the third device or from the third device to the device.

In this case, any one of the server, the device, and the third device may perform the method according to the embodiments of the disclosure by executing the computer program product. Alternatively, at least two of the server, the device, and the third device may perform the method according to the embodiments of the disclosure by executing the computer program product in a distributed fashion.

For example, the server (e.g., a cloud server or an artificial intelligence (AI) server) may execute the computer program product stored in the server to control the device connected to the server for communication to perform the method according to the embodiments of the disclosure.

As another example, the third device may execute the computer program product to control the device connected to the third device for communication to perform the method according to the embodiments of the disclosure. When the third device executes the computer program product, the third device may download the computer program product from the server and may execute the downloaded computer program product. Alternatively, the third device may execute the computer program product provided in a pre-loaded state to perform the method according to the embodiments of the disclosure.

It should be understood that the embodiments of the disclosure described herein should be considered in a descriptive sense only and not for purposes of limitation. That is, it will be understood by one of ordinary skill in the art that various changes in form and details may be made in the embodiments of the disclosure without departing from the spirit and scope of the disclosure. Also, the embodiments of the disclosure may be used in combination when necessary.

The invention claimed is:

1. A method, performed by a base station in a wireless communication system, the method comprising:
    determining a user equipment (UE) candidate group set based on channel state information for channels of a plurality of carriers;
    determining to adjust a number of UEs of the UE candidate group set, based on frequency selectivity information between a representative channel selected from the channels of the plurality of carriers and other channels of the plurality of carriers, wherein the frequency selectivity information indicates a difference between the representative channel and the other channels; and
    transmitting, to a plurality of UEs, the data on the representative channel,
    wherein, in case that the difference is less than a threshold value, a number of the plurality of UEs is greater than the number of UEs of the UE candidate group set, and
    wherein, in case that the difference is greater than the threshold value, the number of the plurality of UEs is less than the number of UEs of the UE candidate group set.

2. The method of claim 1, wherein determining to adjust the number of UEs of the UE candidate group set comprises:
    based on the channel state information, obtaining the frequency selectivity information including at least one of a root-mean-square error (RMSE) of the difference, a variance of the difference, an average of an inner product value between the representative channel and the other channels, a variance of the inner product value, or peak-to-average power ratio (PAPR) information or correlation information.

3. The method of claim 2,
wherein transmitting the data on the representative channel comprises:
determining an offset in case that the number of UEs of the UE candidate group set is to be adjusted;
determining the plurality of UEs by adding or subtracting at least one UE to or from the UE candidate group set, a number of the added or subtracted at least one UE being equal to the determined offset, and
transmitting, to the determined plurality of UEs, the data on the representative channel.

4. A base station in a wireless communication system, the base station comprising:
a transceiver;
a memory configured to store a plurality of instructions; and
at least one processor coupled to the transceiver and configured to execute the plurality of instructions, to
determine a UE candidate group set based on channel state information for the channels of the plurality of carriers,
determine to adjust a number of UEs of the UE candidate group set, based on frequency selectivity information between a representative channel selected from the channels of the plurality of carriers and other channels of the plurality of carriers, wherein the frequency selectivity information indicates a difference between the representative channel and the other channels, and transmit, to a plurality of UEs, the data on the representative channel,
wherein, in case that the difference is less than a threshold value, a number of the plurality of UEs is greater than the number of UEs of the UE candidate group set, and
wherein, in case that the difference is greater than the threshold value, the number of the plurality of UEs is less than the number of UEs of the UE candidate group set.

5. The base station of claim 4, wherein the at least one processor is further configured to
based on the channel state information, obtain the frequency selectivity information including at least one of a root-mean-square error (RMSE) of the difference, a variance of the difference, an average of an inner product value between the representative channel and the other channels, a variance of the inner product value, or peak-to-average power ratio (PAPR) information or correlation information.

6. The base station of claim 5, wherein the at least one processor is further configured to,
determine an offset in case that the number of UEs of the UE candidate group set is to be adjusted,
determine the plurality of UEs by adding or subtracting at least one UE to or from the UE candidate group set, a number of the added or subtracted at least one UE being equal to the determined offset, and
transmit, to the determined plurality of UEs, the data on the representative channel.

7. The base station of claim 5, wherein the at least one processor is further configured to,
based on a probability distribution difference of frequency selectivity information about cases that the UE candidate group set is adjusted by using each of a plurality of offsets, classify the plurality of offsets into two or more groups, and,
based on frequency selectivity information having a largest probability distribution difference in the frequency selectivity information for the two or more groups, determine the threshold value.

8. The base station of claim 5, wherein the at least one processor is further configured to
determine an activated bandwidth part (BWP) from among a plurality of BWPs, and
determine the threshold value corresponding to the activated BWP.

* * * * *